US010816006B2

(12) United States Patent
Milone et al.

(10) Patent No.: US 10,816,006 B2
(45) Date of Patent: Oct. 27, 2020

(54) TURBOMACHINE WITH A BALANCE DRUM AND SLEEVE ARRANGEMENT AND METHOD

(71) Applicant: Nuovo Pignone Tecnologie Srl, Florence (IT)

(72) Inventors: Fabrizio Milone, Florence (IT); Giulio Elicio, Florence (IT)

(73) Assignee: NUOVO PIGNONE SRL, Florence (IT)

( * ) Notice: Subject to any disclaimer, the term of this patent is extended or adjusted under 35 U.S.C. 154(b) by 120 days.

(21) Appl. No.: 15/756,697

(22) PCT Filed: Sep. 7, 2016

(86) PCT No.: PCT/EP2016/071051
§ 371 (c)(1),
(2) Date: Mar. 1, 2018

(87) PCT Pub. No.: WO2017/042200
PCT Pub. Date: Mar. 16, 2017

(65) Prior Publication Data
US 2018/0266428 A1    Sep. 20, 2018

(30) Foreign Application Priority Data

Sep. 8, 2015    (IT) .................. 102015000049594

(51) Int. Cl.
*F04D 29/041*   (2006.01)
*F04D 29/051*   (2006.01)
(Continued)

(52) U.S. Cl.
CPC ..... *F04D 29/0416* (2013.01); *F04D 29/0516* (2013.01); *F04D 29/102* (2013.01);
(Continued)

(58) Field of Classification Search
CPC ............ F04D 29/0416; F04D 29/0516; F04D 29/162; F04D 29/102; F04D 29/106;
(Continued)

(56) References Cited

U.S. PATENT DOCUMENTS

| 3,940,153 A | 2/1976 | Stocker |
| 4,715,778 A * | 12/1987 | Katayama ............. F04D 17/122 |
| | | 415/104 |
| 2014/0169954 A1 * | 6/2014 | Iurisci .................... F01D 5/043 |
| | | 415/173.5 |

FOREIGN PATENT DOCUMENTS

| DE | 646 436 C | 6/1937 |
| EP | 2 083 200 A1 | 7/2009 |

(Continued)

OTHER PUBLICATIONS

Italian Search Report and Written Opinion issued in connection with corresponding IT Application No. 102015000049594 dated Apr. 28, 2016.

(Continued)

*Primary Examiner* — David E Sosnowski
*Assistant Examiner* — Danielle M. Christensen
(74) *Attorney, Agent, or Firm* — Baker Hughes Patent Organization

(57) ABSTRACT

The turbomachine comprises a stationary casing with a rotating member configured to rotate about a rotation axis in the stationary casing. The turbomachine further includes a rotating balance drum, arranged for co-rotation with the rotating member. A stationary sleeve is arranged in a fixed relationship with the stationary casing and surrounds the balance drum. The stationary sleeve comprises a plurality of consecutively arranged sleeve sections. A fluid channel is defined by an outer surface of the balance drum and an inner surface of the stationary sleeve. Between at least one pair of sequentially arranged upstream sleeve section and down-
(Continued)

stream sleeve section an annular chamber is provided, fluidly coupled to the fluid channel. Shunt holes are arranged on the upstream sleeve section, each shunt hole having a shunt hole inlet on an inner surface of the upstream sleeve section, and a shunt hole outlet in the annular chamber.

8 Claims, 5 Drawing Sheets

(51) Int. Cl.
*F16J 15/00* (2006.01)
*F16J 15/16* (2006.01)
*F04D 29/10* (2006.01)
*F16C 33/10* (2006.01)
*F04D 29/16* (2006.01)
*F16C 17/02* (2006.01)
*F16J 15/44* (2006.01)

(52) U.S. Cl.
CPC ......... *F04D 29/106* (2013.01); *F04D 29/162* (2013.01); *F16C 17/02* (2013.01); *F16C 33/1005* (2013.01); *F16C 33/109* (2013.01); *F16J 15/006* (2013.01); *F16J 15/164* (2013.01); *F16J 15/443* (2013.01); *F16C 2360/23* (2013.01); *F16C 2360/44* (2013.01)

(58) Field of Classification Search
CPC .... F16C 2360/44; F16C 17/02; F16C 33/109; F16C 33/1005; F16J 15/006; F16J 15/443; F16J 15/164
See application file for complete search history.

(56) References Cited

FOREIGN PATENT DOCUMENTS

JP         01237394 A    *  9/1989
JP       2012140944 A    *  7/2012

OTHER PUBLICATIONS

International Search Report and Written Opinion issued in connection with corresponding PCT Application No. PCT/EP2016/071051 dated Nov. 17, 2016.
International Preliminary Report on Patentability issued in connection with corresponding PCT Application No. PCT/EP2016/071051 dated Mar. 13, 2018.

* cited by examiner

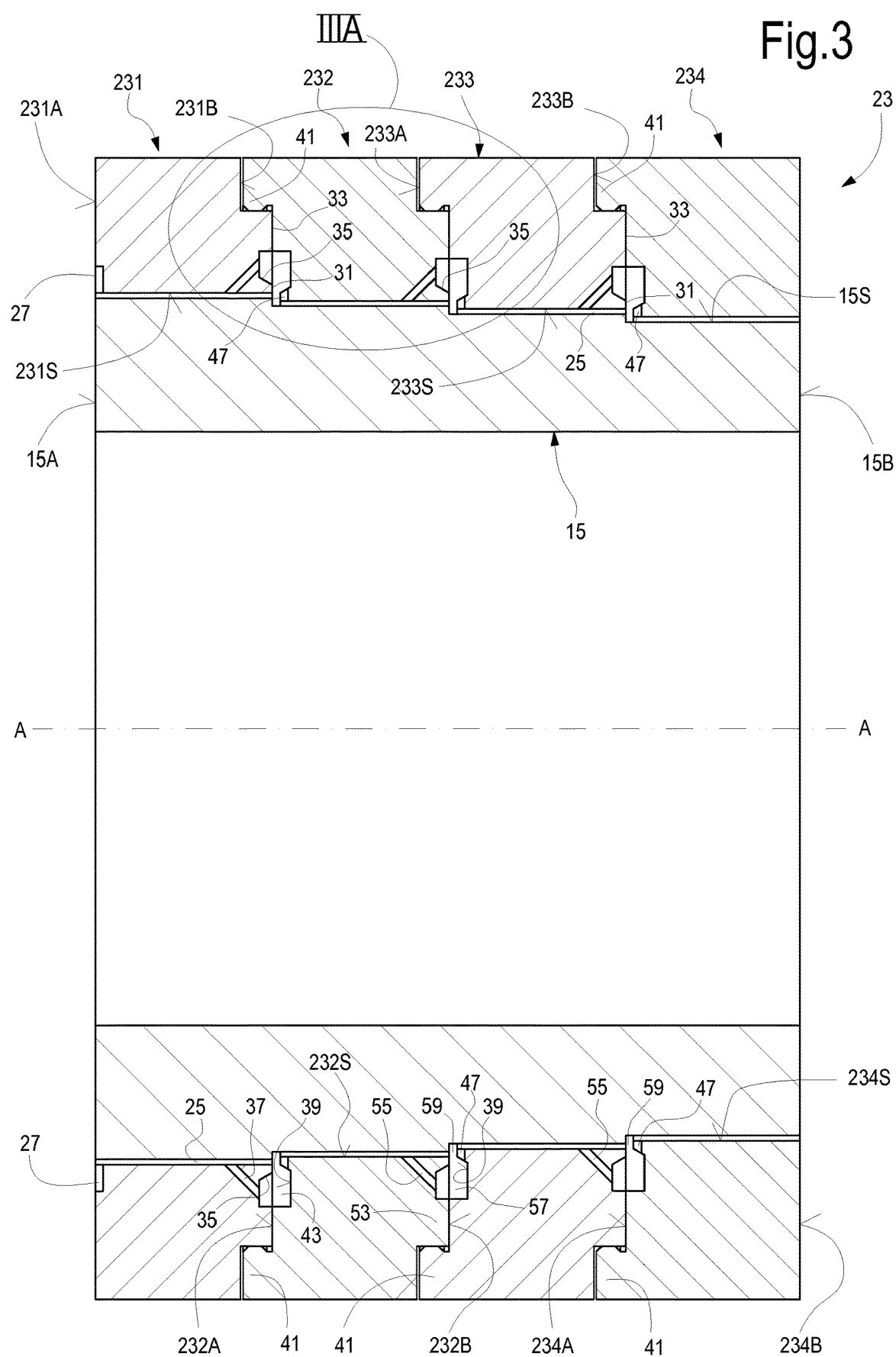

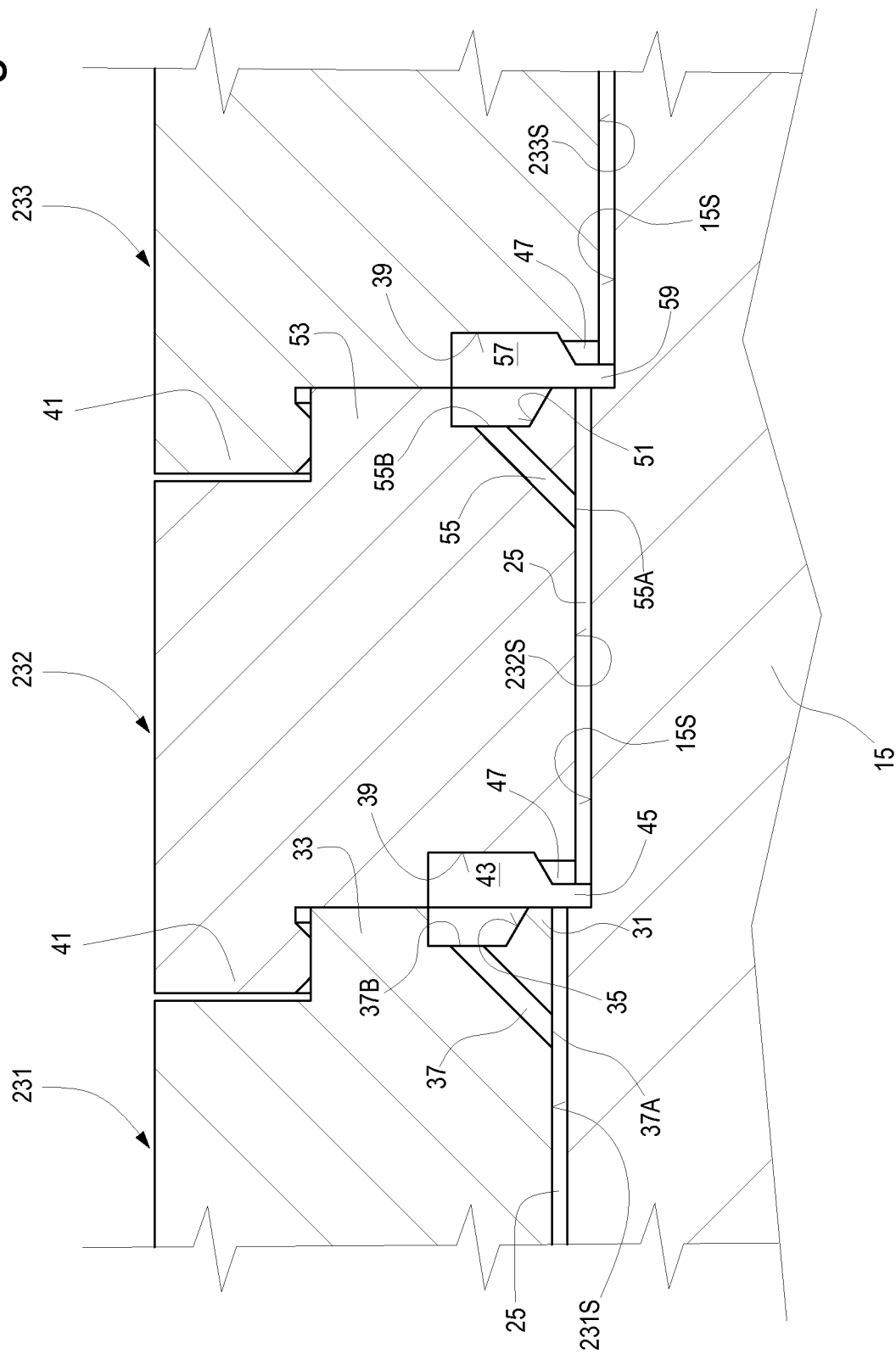

TURBOMACHINE WITH A BALANCE DRUM AND SLEEVE ARRANGEMENT AND METHOD

BACKGROUND OF THE INVENTION

The disclosure in general relates to balance piston arrangements for rotating machines, in particular turbomachines, such as centrifugal pumps and centrifugal compressors. Embodiments disclosed herein specifically refer to multiphase pumps and compressors, e.g. for subsea applications.

Rotary turbomachines, such as compressors and pumps, induce a pressure differential in the process fluid processed by the turbomachine. An axial reaction force is imparted on the rotor of the turbomachine. In some cases, a balance drum and sleeve arrangement is provided, to generate a balancing axial thrust on the rotor of the turbomachine, counteracting the axial reaction force. The balance drum, also referred to as balance piston, is in fixed relationship with the rotor of the turbomachine and rotates therewith.

The balance drum has opposite and axially distanced first and second surfaces, which face respectively a first volume and a second volume inside the turbomachine. In the first volume, process fluid at a first pressure is present, while in the second volume process fluid at a second pressure is present, the second pressure being lower than the first pressure. The pressure difference between the first volume and second volume generate an axial balancing force acting upon the balance drum.

A fluid channel is defined between the rotating balance drum and the sleeve, which channel is in fixed relationship with the turbomachine casing. The fluid channel has an annular cross section and is bounded by the outer substantially cylindrical surface of the balance drum and the inner, substantially cylindrical surface of the sleeve. The fluid channel places in fluid communication the first volume and the second volume, such that process fluid flows through the fluid channel under the pressure differential between the first volume and second volume.

Process fluid flowing in the fluid channel provides a radial bearing effect on the rotating balance drum. This bearing effect, also known as Lomakin effect, is specifically important in turbomachines configured for processing a multiphase process fluid, e.g. a mixture of gaseous and liquid hydrocarbons from deep offshore oil and gas fields. Lomakin effect gradually reduces along the axial extension of the balance drum, starting from the surface facing the first, high-pressure volume towards the second, low-pressure volume.

Efforts have been made to avoid or reduce the decreasing of Lomakin effect, which becomes specifically relevant when the ratio between the axial length of the balance drum (i.e. the axial length of the fluid channel formed between balance drum and sleeve) and the diameter of the balance drum becomes higher than about 0.7.

Machining of swirl brakes along the inner surface of the sleeve, facing the fluid channel has been suggested, to overcome or alleviate the above mentioned problem. Swirl brakes are usually in the form of notches arranged circularly around the rotation axis of the turbomachine rotor, and are aimed at converting a tangential speed component of process fluid flowing through the fluid channel, into an axial speed component. This known approach turned out to be inefficient, since fluid stagnation cannot be efficiently avoided.

A need therefore exist, for a more efficient balance drum arrangement, specifically in those turbomachines, where the Lomakin effect is important.

SUMMARY OF THE INVENTION

According to a first aspect, disclosed herein is a turbomachine comprising a stationary casing with a fluid inlet and a fluid outlet and a rotating member configured to rotate about a rotation axis in the stationary casing. The turbomachine can further comprise a rotating balance drum, arranged for co-rotation with the rotating member, including a first end surface exposed to a first volume of process fluid and a second end surface exposed to a second volume of process fluid. The first end surface and the second end surface are distanced from one another in an axial direction, i.e. along the rotation axis of the rotating member. While the rotating member is rotating, fluid pressure in the first volume is higher than in the second volume, thereby imparting an axial thrust to the rotating member. The turbomachine further comprises a stationary sleeve in a fixed relationship with the stationary casing and surrounding the balance drum. The stationary sleeve comprises a plurality of consecutively arranged sleeve sections. A fluid channel is defined by an outer surface of the balance drum and an inner surface of the stationary sleeve. The fluid channel has a channel inlet fluidly coupled to the first volume and a channel outlet fluidly coupled to the second volume.

According to embodiments disclosed herein, between at least one pair of sequentially arranged upstream sleeve section and downstream sleeve section, an annular chamber is provided, which is fluidly coupled to the fluid channel. Shunt holes are arranged on the upstream sleeve section, each shunt hole having a shunt hole inlet on an inner surface of the upstream sleeve section, and a shunt hole outlet in the annular chamber.

According to a further aspect, the present disclosure concerns a stationary sleeve for a balance drum arrangement in a turbomachine. The stationary sleeve can have an inner surface configured for surrounding a balance drum arranged therein and can further comprise a plurality of adjacent sleeve sections, wherein between at least one pair of sequentially arranged upstream sleeve section and downstream sleeve section an annular chamber is provided. The annular chamber opens towards the inner surface of the sleeve. Moreover, shunt holes can be arranged on the upstream sleeve section, each shunt hole having a shunt hole inlet on an inner surface portion of the upstream sleeve section, and a shunt hole outlet in the annular chamber.

In some embodiments, the annular chamber is fluidly coupled to the fluid channel by means of a circular slot and swirl brakes can be located along the circular slot.

The upstream sleeve section can have a first side surface facing the downstream sleeve section, and the downstream sleeve section can have a second side surface facing the upstream sleeve section. The first side surface can be provided with a first annular groove and the second side surface can be provided with a second annular groove. The two annular grooves can be configured and arranged such that in an assembled condition, the two annular grooves form the annular chamber therebetween.

Notches can be provided along an edge of at least one of the first side surface and second side surface, said notches forming swirl brakes.

In some embodiments the sleeve sections can be mechanically constrained to one another, i.e. mounted one onto the other by interference fitting, e.g. by means of self-centering profiles.

According to some embodiments, sequentially arranged sleeve sections are constrained to one another by respective annular ridges projecting from opposing side surfaces of the sleeve sections.

The sleeve sections can have gradually decreasing inner diameters, and the balance drum can have a stepped outer surface.

According to yet a further aspect, disclosed herein is a method of operating a turbomachine as above described. The method comprises the following steps:

rotating the rotating member about the rotation axis and processing a process fluid therewith;

generating a first fluid pressure in the first volume and a second fluid pressure in the second volume, the first fluid pressure being higher than the second fluid pressure;

flowing process fluid through the fluid channel from the first volume to the second volume;

establishing a secondary fluid flow through said shunt holes, from the shunt hole inlet to the shunt hole outlet.

Other features and advantages of the invention will be better appreciated from the following detailed description of exemplary embodiments.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein:

FIG. 3 illustrates a sectional view according to line of FIG. 2;

FIG. 3A illustrates an enlargement of a portion of FIG. 3;

DETAILED DESCRIPTION OF EMBODIMENTS

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Figure 1:
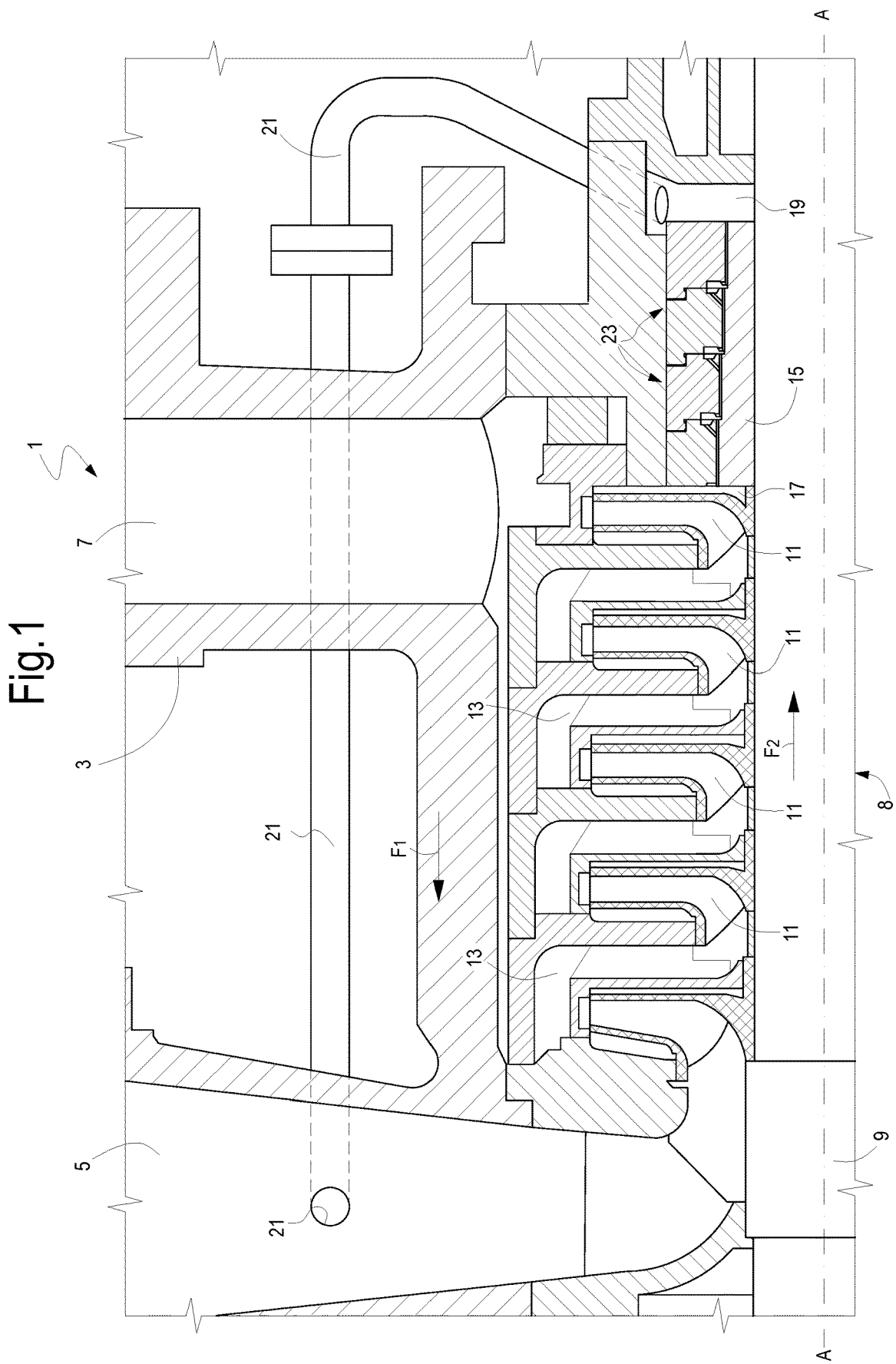
FIG. 1 illustrates a schematic sectional view of a centrifugal pump with a balance drum arrangement.

FIG. 1 schematically illustrates a turbomachine, wherein the subject matter disclosed herein can be embodied. In the exemplary embodiment of FIG. 1 the turbomachine is a centrifugal pump 1, for instance a subsea centrifugal, multistage pump. The centrifugal pump 1 can be a subsea, multiphase pump. While herein below reference will be made specifically to multistage centrifugal pumps, those skilled in the art of turbomachinery will understand that features of the invention disclosed herein can be usefully applied to other kinds of turbomachines, wherein similar criticalities concerning the balance drum and sleeve arrangement arise.

The centrifugal pump 1 can be configured for processing a process fluid, e.g. a multiphase process fluid, such as a mixture of hydrocarbons having different molecular weights.

The centrifugal pump 1 comprises a stationary casing 3 provided with a fluid inlet 5 and a fluid outlet 7. A rotating member 8 is arranged in the casing 3 for rotation around a rotation axis A-A. The rotating member 8 can include a shaft 9 rotatingly supported in the casing 3, e.g. by means of bearings, such as hydrodynamic bearings, arranged at opposite ends of the shaft 9 and not shown. Other bearing arrangements can be used, such as for instance active magnetic bearings, rolling bearings and the like, or combinations thereof.

The rotating member 8 further comprises one or more impellers 11 in a fixed relationship with the shaft 9, i.e. rotating therewith. Between pairs of sequentially arranged impellers 11, return channels 13 are arranged, which connect the outlet of an upstream impeller of the pair of sequentially arranged impellers 11, to the inlet of a downstream impeller of said pair. As used herein, the terms "upstream" and "downstream" are referred to the direction of flow of the process fluid through the turbomachine, unless differently indicated.

The centrifugal pump 1 further includes a balance drum 15, which is mounted on the shaft 11 for co-rotation therewith and with the rotating member 8. The balance drum 15 comprises a broadly cylindrical outer surface 15S, which extends axially, i.e. parallel to the rotation axis A-A, between a first end surface 15A and a second end surface 15B. The first end surface 15A and the second end surface 15B are distanced from one another in the axial direction, i.e. in a direction parallel to the rotation axis A-A.

In some embodiments the balance drum 15 can have a substantially constant diameter. In other embodiments, as shown in the drawings, the balance drum 15 can have a stepped outer surface 15S, and a variable diameter, e.g. decreasing from the first end surface 15A towards the second end surface 15B.

The first end surface 15A faces the back of the most downstream impeller 11 and is exposed to a first volume 17, where process fluid at a first pressure is present when the centrifugal pump 1 is operating. The second end surface 15B faces a second volume 19, where process fluid at a second pressure is present when the centrifugal pump 1 is operating. The first pressure is higher than the second pressure. In some embodiments, the first pressure substantially corresponds to the delivery pressure of the centrifugal pump 1, i.e. the delivery pressure in the fluid outlet 7. The second volume 19 can be in fluid communication with the fluid inlet 5, such that the fluid pressure in the second volume 19 is substantially the same as the suction pressure at the fluid inlet 5. A balance line 21 can be provided to fluidly couple the second volume 19 to the fluid inlet 5.

During operation of the centrifugal pump 1, an axial thrust is thus generated on the balance drum 15, which is determined by the differential pressure between the first volume 17 and the second volume 19. The axial thrust is oriented opposite the thrust generated on the rotating member 8 by the interaction between the process fluid and the impellers 11.

Around the balance drum 15 a stationary sleeve 23 is arranged. The sleeve 23 is substantially coaxial to the balance drum 15 and is in a fixed relationship with the stationary casing 3. The sleeve 23 is stationarily mounted in the casing 3, e.g. in a seat formed therein, substantially coaxial with the shaft 9.

Figure 2:
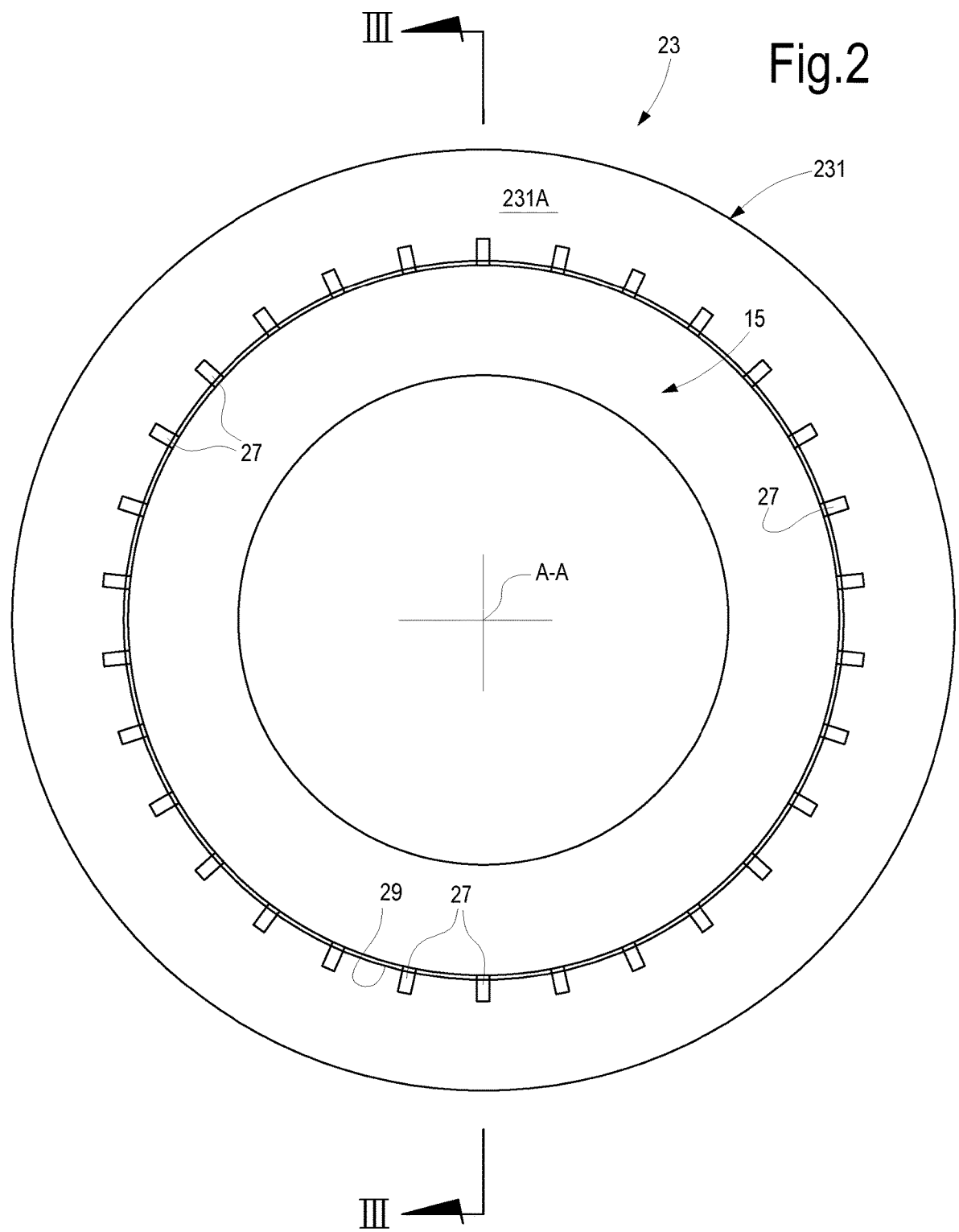
FIG. 2 illustrates a front view of a balance drum and sleeve arrangement.

As best shown in FIGS. 2 and 3, between the outer surface 15S of the balance drum 15 and an inner surface, broadly shown at 23S, of the sleeve 23, a fluid channel 25 is formed. The fluid channel 25 has the shape of a circular gap, extending from a channel inlet at the first end surface 15A of the balance drum 15, to a channel outlet at the second end surface 15B. The channel inlet is thus fluidly coupled to the first volume 17, and the channel outlet is fluidly coupled to the second volume 19. Process fluid flows through the fluid channel 25 from the channel inlet to the channel outlet due to the differential pressure between the first volume 17 and the second volume 19.

As best shown in FIG. 3, the stationary sleeve 23 can be comprised of a plurality of sleeve sections 231, 232, 233, 234. In the exemplary embodiment of FIG. 3 four sleeve sections are shown. However, those skilled in the art will understand that the number of sleeve sections can be different, e.g. three, or else a number larger than four such sleeve sections can be provided, depending upon the total axial length of the balance drum 15 and sleeve 23.

The first, i.e. the most upstream sleeve section 231, and the last, i.e. most downstream sleeve section 234, differ in shape from each other and from the intermediate sleeve sections 232, 233. These latter can be identical to one another or differ from one another, e.g. they can have slightly differing inner diameters, as shown in FIG. 3, such that the sleeve 23 has a stepped inner surface 23S.

Figure 4:
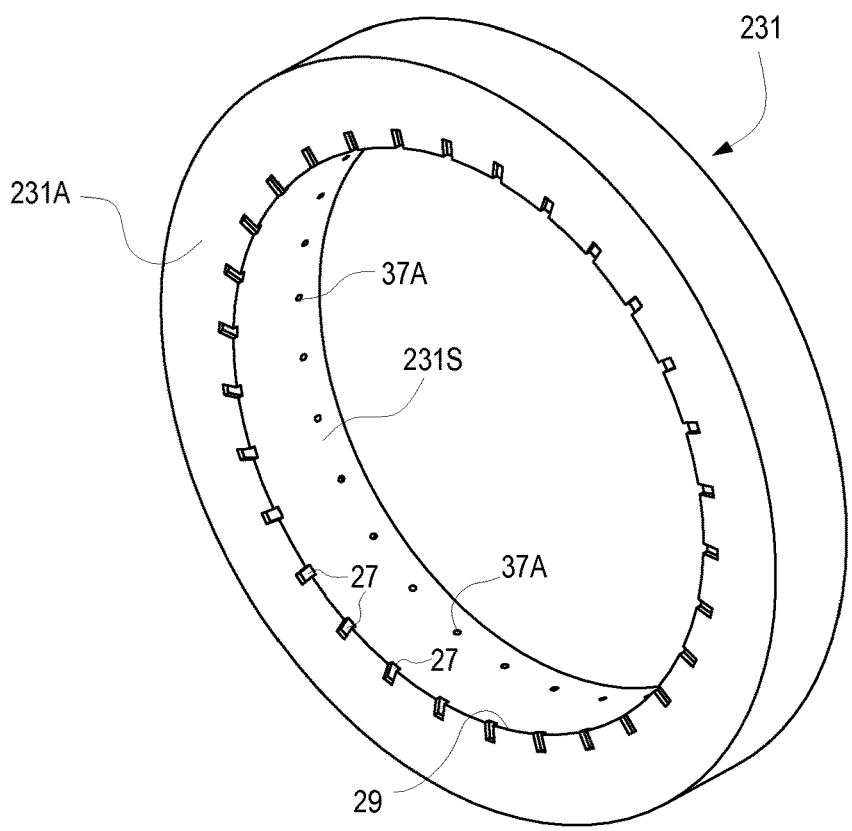
FIGS. 4 and 5 illustrate isometric views of a sleeve section.
Figure 5:
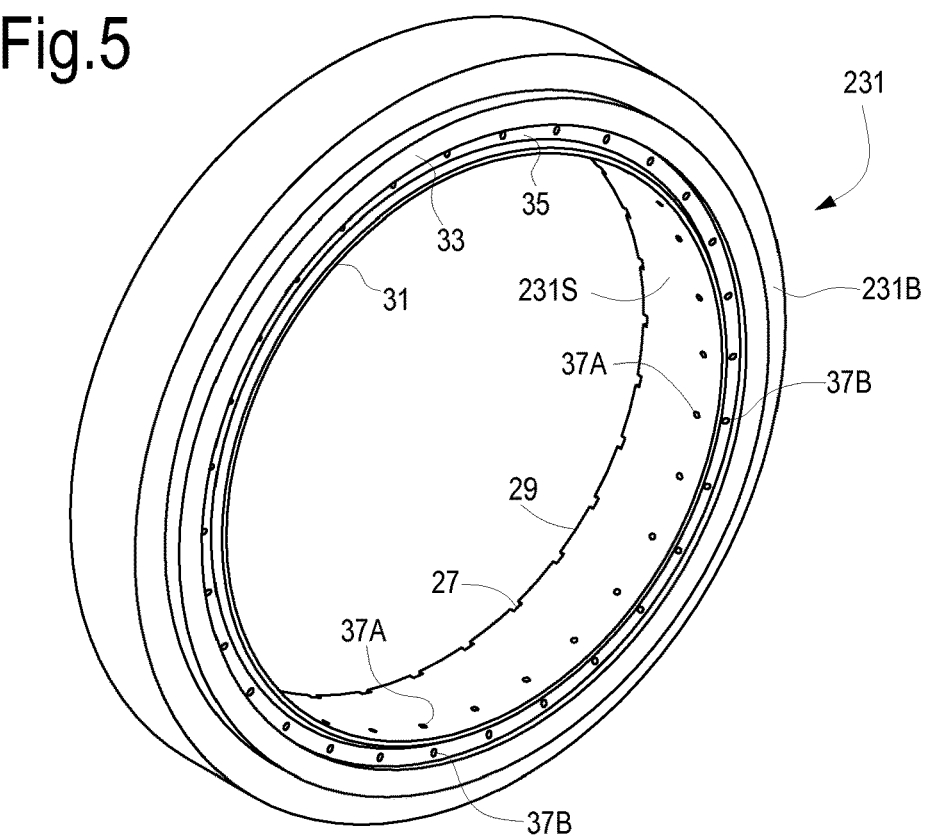

The first, i.e. most upstream sleeve section 231 comprises an inner cylindrical surface 231S, substantially coaxial to a respective portion of the outer surface 15S of the balance drum 15. The first sleeve section 231 further comprises an upstream side surface 231A facing the first volume 17, and a downstream side surface 231B facing the next sleeve section 233. In some embodiments, as best shown in FIG. 4, notches 27 can be provided along the edge 29 provided between the upstream side surface 231A and the inner cylindrical surface 231S. The notches 27 can have a predominantly radial extension and form inlet swirl brakes.

The downstream side surface 231B can be provided with annular ridges 31, 33, between which an annular groove 35 is formed.

The first sleeve section 231 further comprises a plurality of shunt holes 37 (see FIGS. 3, 3A), arranged around the rotation axis A-A. Each shunt hole 37 has a shunt hole inlet 37A on the inner surface 231S and a shunt hole outlet 37B in the annular groove 35.

The intermediate sleeve section 232 has an inner surface 232S, having a diameter smaller than the diameter of inner surface 231S of the first sleeve section 231. The intermediate sleeve section 232 further has an upstream side surface 232A, facing the first sleeve section 231, and a downstream side surface 232B, facing the adjacent intermediate sleeve section 232. An annular groove 39 and an annular ridge 41 are further provided on the upstream side surface 232A. The annular groove 39 faces the annular groove 35 formed on the first sleeve section 231 and the two annular grooves 35, 39 together form an annular chamber 43.

The annular chamber 43 is in fluid communication with the fluid channel 25 through a circular slot 45 formed between the sleeve sections 231 and 232. Notches 47 are provided along an edge of the second sleeve section 232. The notches 47 can be similar in shape to notches 27 and form swirl brakes distributed, with a constant pitch, around the circular slot 45 (see FIG. 3A).

The downstream side surface 232B of the intermediate sleeve section 232 has an annular groove 51 formed therein and an annular ridge 53. Shunt holes 55 are further provided in the sleeve section 232. Each shunt hole 55 has a shunt hole inlet 55A on the inner surface 232S and a shunt hole outlet 55B in the annular groove 51.

The third sleeve section 233 can be similar or identical to the second sleeve section 232. In the exemplary embodiment illustrated herein, the third sleeve section 233 is shaped as the second sleeve section 232 but has an inner surface 233S with a diameter smaller than the diameter of the inner surface 232S. The inner surface 233S faces a corresponding cylindrical portion of the outer surface 15S of the balance drum 15, said outer surface 15S being stepped, to conform to the gradually decreasing diameter of the inner surfaces of the sequentially arranged sleeve sections.

An annular chamber 57 is formed by the annular groove 51 of sleeve section 232 and the annular groove 39 of sleeve section 233. The annular chamber 57 is in fluid communication with the flow channel 25 through an annular slot 59. Shunt holes, again labeled 55, are provided in the third sleeve section 233, each having a shunt hole inlet 55A, on the inner surface 233S, and a shunt hole outlet 55B leading in the annular chamber 57. Swirl brakes 47 are further provided, in an arrangement similar to sleeve section 232.

Additional similar sleeve sections can be arranged in sequence, if required to reach the desired axial length of the sleeve 23.

The most downstream sleeve section 234 has an upstream side surface shaped quite in the same way as the upstream side surface 232A of the sleeve section 232, co-acting with the downstream side surface of the sleeve section 233, which is shaped quite in the same way as the downstream side surface 233B of sleeve section 233, such that an annular chamber, quite the same as annular chamber 57, is formed between the third and fourth sleeve sections 233 and 234, where shunt holes 55 provided in the third sleeve section 233 lead.

Self-centering coupling of the sequentially arranged sleeve sections 231-234 is obtained by interference fit between the annular ridges 33, 41, 53, which form self-centering profiles. In this way, no external additional centering sleeve is required and the sleeve sections arrangement formed by self-centered sleeve sections 231-234, which are mutually locked to one another, can be directly mounted in a seat provided in the centrifugal pump casing 3.

Operation of the centrifugal pump 1 described so far, and specifically of the balance drum and sleeve arrangement, is as follows. Process fluid at a suction pressure enters the centrifugal pump 1 at the fluid inlet 5 and is delivered at the fluid outlet 7 at a delivery pressure, higher than the suction pressure. The fluid pressure differential is generated by rotation of the impellers 11, which are rotated by a mover, such as an electric motor, not shown. An axial thrust oriented according to arrow F1 (FIG. 1) is imparted by the process fluid on the rotating member 8 comprised of rotating shaft 9 and impellers 11. The fluid pressure in the first volume 17 is substantially equal to the delivery pressure, while the fluid pressure in the second volume 19 is substantially equal to the suction pressure, as the second volume 19 is fluidly coupled to the fluid inlet 5 through the balance line 21. The pressure differential generates a balance force oriented according to arrow F2 (FIG. 1), in a direction opposite to the axial thrust F1, such that the axial thrust F1 is at least partly balanced. If the centrifugal pump 1 is arranged with a vertical rotation axis A-A, the balance force F2 can also partly balance the weight of the rotating member 8.

Due to the pressure differential between the first volume 17 and the second volume 19, a process fluid flow is established along the fluid channel 25 from the first volume 17 to the second volume 19. The process fluid flow has an axial speed component and a tangential speed component, due to the rotation of the outer surface 15S of the balance drum 15, which rotates with the shaft 9 and the impellers 11. The swirl brakes 47 arranged along the sleeve 23 are provided for suppressing or reducing the tangential flow and converting the tangential flow speed component into an axial speed component, promoting flowing of the fluid through the fluid channel 25.

The fluid flow through the fluid channel 25 provides a radial supporting action on the rotating balance drum 15, due to the Lomakin effect, which contributes to stabilizing the rotating member 8. The Lomakin effect gradually reduces as the length of the flow channel 25 increases, due to the tendency of the process fluid to stagnate along the flow channel 25.

In order to prevent or reduce fluid stagnation along the fluid channel 25, and consequent loss of the Lomakin effect along the axial extension of the fluid channel 25, the flow of process fluid is supported by the shunt holes 37 provided along the flow channel 25, at the junction between neighboring sleeve sections 231, 232, 233. As the shunt hole inlet 37A of each shunt hole 37 is arranged upstream of the corresponding shunt hole outlet 37B, with respect to the general process fluid flow in the flow channel 25, a pressure differential establishes between the inlet and the outlet of each shunt hole 37. A process fluid flow is thus generated inside the shunt holes, which increases the pressure in each annular chamber 43, 57, thus promoting the axial flow of the process fluid in the fluid channel 25, enhancing the Lomakin effect.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

The invention claimed is:

1. A turbomachine comprising:
a stationary casing;
a rotatable member configured to rotate about a rotation axis in the stationary casing;
a rotatable balance drum, arranged for co-rotation with the rotatable member, comprising a first end surface exposed to a first volume of process fluid and a second end surface exposed to a second volume of process fluid, the first end surface and the second end surface being distanced from one another in an axial direction, wherein when the rotatable member rotates, fluid pressure in the first volume is higher than in the second volume to impart an axial thrust to the rotatable member;
a stationary sleeve in a fixed relationship with the stationary casing and surrounding the balance drum, the stationary sleeve comprising a plurality of consecutively arranged sleeve sections including at least one pair of sequentially arranged sleeve sections, the at least one pair comprising an upstream sleeve section and a downstream sleeve section;
a fluid channel defined by an outer surface of the balance drum and an inner surface of the stationary sleeve, the fluid channel having a channel inlet fluidly coupled to the first volume and a channel outlet fluidly coupled to the second volume;
an annular chamber between the upstream sleeve section and the downstream sleeve section and fluidly coupled to the fluid channel via a circular slot;
swirl brakes located along the circular slot; and
shunt holes arranged on the upstream sleeve section, each shunt hole having a shunt hole inlet on an inner surface of the upstream sleeve section and a shunt hole outlet in the annular chamber.

2. A turbomachine comprising:
a stationary casing;
a rotatable member configured to rotate about a rotation axis in the stationary casing;
a rotatable balance drum, arranged for co-rotation with the rotatable member, comprising a first end surface exposed to a first volume of process fluid and a second end surface exposed to a second volume of process fluid, the first end surface and the second end surface being distanced from one another in an axial direction, wherein when the rotatable member rotates, fluid pressure in the first volume is higher than in the second volume to impart an axial thrust to the rotatable member;
a stationary sleeve in a fixed relationship with the stationary casing and surrounding the balance drum, the stationary sleeve comprising a plurality of consecutively arranged sleeve sections mechanically coupled to one another by interference fitting and including at least one pair of sequentially arranged sleeve sections, the at least one pair comprising an upstream sleeve section and a downstream sleeve section;
a fluid channel defined by an outer surface of the balance drum and an inner surface of the stationary sleeve, the fluid channel having a channel inlet fluidly coupled to the first volume and a channel outlet fluidly coupled to the second volume;
an annular chamber between the upstream sleeve section and the downstream sleeve section and fluidly coupled to the fluid channel; and
shunt holes arranged on the upstream sleeve section, each shunt hole having a shunt hole inlet on an inner surface of the upstream sleeve section and a shunt hole outlet in the annular chamber.

3. The turbomachine of claim 2, wherein the plurality of consecutive sleeve sections define self-centering profiles.

4. The turbomachine of claim 2, wherein consecutively arranged sleeve sections are constrained to one another by respective annular ridges projecting from opposing side surfaces of the sleeve sections.

5. A turbomachine comprising:
a stationary casing;

a rotatable member configured to rotate about a rotation axis in the stationary casing;

a rotatable balance drum, arranged for co-rotation with the rotatable member, comprising a first end surface exposed to a first volume of process fluid and a second end surface exposed to a second volume of process fluid, the first end surface and the second end surface being distanced from one another in an axial direction, wherein when the rotatable member rotates, fluid pressure in the first volume is higher than in the second volume to impart an axial thrust to the rotatable member;

a stationary sleeve in a fixed relationship with the stationary casing and surrounding the balance drum, the stationary sleeve comprising a plurality of consecutively arranged sleeve sections including at least one pair of sequentially arranged sleeve sections, the at least one pair comprising an upstream sleeve section and a downstream sleeve section;

a fluid channel defined by an outer surface of the balance drum and an inner surface of the stationary sleeve, the fluid channel having a channel inlet fluidly coupled to the first volume and a channel outlet fluidly coupled to the second volume;

an annular chamber between the upstream sleeve section and the stream sleeve section and fluidly coupled to the fluid channel; and shunt holes arranged on the upstream sleeve section, each shunt hole having a shunt hole inlet on an inner surface of the upstream sleeve section and a shunt hole outlet in the annular chamber, wherein the downstream sleeve section has a smaller inner diameter than the upstream sleeve section and the balance drum has a stepped outer surface.

6. A turbomachine comprising:

a stationary casing;

a rotatable member configured to rotate about a rotation axis in the stationary casing;

a rotatable balance drum, arranged for co-rotation with the rotatable member, comprising a first end surface exposed to a first volume of process fluid and a second end surface exposed to a second volume of process fluid, the first end surface and the second end surface being distanced from one another in an axial direction, wherein when the rotatable member rotates, fluid pressure in the first volume is higher than in the second volume to impart an axial thrust to the rotatable member;

a stationary sleeve in a fixed relationship with the stationary casing and surrounding the balance drum, the stationary sleeve comprising a plurality of consecutively arranged sleeve sections including at least one pair of sequentially arranged sleeve sections, the at least one pair comprising an upstream sleeve section and a downstream sleeve section;

a fluid channel defined by an outer surface of the balance drum and an inner surface of the stationary sleeve, the fluid channel having a channel inlet fluidly coupled to the first volume and a channel outlet fluidly coupled to the second volume;

an annular chamber between the upstream sleeve section and the downstream sleeve section and fluidly coupled to the fluid channel; and shunt holes arranged on the upstream sleeve section, each shunt hole having a shunt hole inlet on an inner surface of the upstream sleeve section and a shunt hole outlet in the annular chamber, wherein the upstream sleeve section has a first side surface facing the downstream sleeve section and the downstream section has a second side surface facing the upstream sleeve section, and notches are arranged along an edge of at least one of the first side surface and second side surface.

7. The turbomachine of claim 6, wherein the first side surface is provided with a first annular groove and the second side surface is provided with a second annular groove, the two annular grooves forming the annular chamber therebetween.

8. The turbomachine of claim 6, wherein the notches form swirl brakes.

* * * * *